(12) United States Patent
Nakayama

(10) Patent No.: US 10,378,382 B2
(45) Date of Patent: Aug. 13, 2019

(54) BOLT FALL-OUT PREVENTING STRUCTURE

(71) Applicant: MITSUBISHI HITACHI POWER SYSTEMS, LTD., Kanagawa (JP)

(72) Inventor: Takeki Nakayama, Kanagawa (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 209 days.

(21) Appl. No.: 15/546,391

(22) PCT Filed: Jan. 26, 2016

(86) PCT No.: PCT/JP2016/052146
§ 371 (c)(1),
(2) Date: Jul. 26, 2017

(87) PCT Pub. No.: WO2016/121742
PCT Pub. Date: Apr. 8, 2016

(65) Prior Publication Data
US 2018/0023419 A1     Jan. 25, 2018

(30) Foreign Application Priority Data

Jan. 30, 2015    (JP) ................................. 2015-017844

(51) Int. Cl.
*F01D 25/24*     (2006.01)
*F16B 39/10*     (2006.01)
(Continued)

(52) U.S. Cl.
CPC ......... *F01D 25/243* (2013.01); *F01D 25/246* (2013.01); *F16B 39/02* (2013.01);
(Continued)

(58) Field of Classification Search
None
See application file for complete search history.

(56) References Cited

U.S. PATENT DOCUMENTS 5,971,337 A * 10/1999 Furuya .................... B25B 23/00
                                                        248/309.1
6,457,925 B1 * 10/2002 Genick, II ............ F16B 41/002
                                                        411/339

(Continued)

FOREIGN PATENT DOCUMENTS

JP                 59-71902           5/1984

OTHER PUBLICATIONS

International Search Report dated Mar. 1, 2016 in International (PCT) Application No. PCT/JP2016/052146.

(Continued)

*Primary Examiner* — Michael Lebentritt
(74) *Attorney, Agent, or Firm* — Wenderoth, Lind & Ponack, L.L.P.

(57) ABSTRACT

A bolt fall-out preventing structure includes: a first member, a first hole (13) being formed in the first portion (14) and the second portion (15); a first bolt member including a first head portion inserted into the first hole of the first member and disposed on the second portion, the first bolt member fixing the first member to a support member; a second member including a third portion and a fourth portion, the second member engaging with the first member; a second bolt member including a second head portion that opposes the first head portion; and a wall portion on the second head portion, the wall portion being disposed between a side surface of the first head portion and the second portion.

8 Claims, 16 Drawing Sheets

(51) Int. Cl.
*F16B 41/00* (2006.01)
*F16B 39/02* (2006.01)
*F01D 9/04* (2006.01)

(52) U.S. Cl.
CPC .............. *F16B 39/10* (2013.01); *F16B 41/00* (2013.01); *F01D 9/04* (2013.01); *F05D 2220/31* (2013.01); *F05D 2260/31* (2013.01)

(56) References Cited

U.S. PATENT DOCUMENTS

| | | | | |
|---|---|---|---|---|
| 9,611,046 | B1* | 4/2017 | Takeuchi | B64D 27/18 |
| 2002/0150445 | A1* | 10/2002 | Ozawa | F16B 5/0233 |
| | | | | 411/546 |
| 2008/0124419 | A1* | 5/2008 | Tanaka | B29C 45/1747 |
| | | | | 425/170 |
| 2009/0081030 | A1* | 3/2009 | Sullivan | F01D 25/243 |
| | | | | 415/182.1 |
| 2009/0092462 | A1* | 4/2009 | Pratt | F16B 13/066 |
| | | | | 411/368 |
| 2009/0290951 | A1* | 11/2009 | Blom | F16B 33/002 |
| | | | | 411/82 |
| 2009/0297261 | A1* | 12/2009 | Mons | F16B 19/02 |
| | | | | 403/337 |
| 2010/0028103 | A1* | 2/2010 | Soeda | F16B 39/20 |
| | | | | 411/530 |
| 2012/0023864 | A1* | 2/2012 | Zheng | E04C 3/08 |
| | | | | 52/782.1 |
| 2013/0108394 | A1* | 5/2013 | Zhu | F16B 7/18 |
| | | | | 411/366.1 |
| 2013/0129501 | A1* | 5/2013 | Scothern | F01D 25/243 |
| | | | | 415/214.1 |
| 2013/0266396 | A1* | 10/2013 | Dionne | F16B 39/26 |
| | | | | 411/313 |
| 2014/0010646 | A1* | 1/2014 | Cao | F01D 25/243 |
| | | | | 415/229 |
| 2015/0028142 | A1* | 1/2015 | Coray | B02C 17/22 |
| | | | | 241/300 |
| 2017/0259198 | A1* | 9/2017 | Snels | B01D 19/0057 |
| 2017/0291773 | A1* | 10/2017 | Daitoku | B65G 45/10 |
| 2017/0328027 | A1* | 11/2017 | Lanzl | E02F 3/3636 |
| 2017/0363133 | A1* | 12/2017 | Friedrich | B60R 16/02 |
| 2018/0172054 | A1* | 6/2018 | Saigo | F16B 23/0007 |

OTHER PUBLICATIONS

Written Opinion of the International Searching Authority dated Mar. 1, 2016 in International (PCT) Application No. PCT/JP2016/052146.

* cited by examiner

BOLT FALL-OUT PREVENTING STRUCTURE

TECHNICAL FIELD

The present invention relates to a bolt fall-out preventing structure.

BACKGROUND ART

Examples of measures for preventing bolts from falling out include welding the bolt head or using a pin or the like to lock the bolt head. The flow guide described in Patent Document 1 is disposed inside a casing that houses a turbine and guides working fluid (steam) flowing in the casing. This flow guide is fixed to the casing by a bolt member.

CITATION LIST

Patent Document

Patent Document 1: Japanese Utility Model Application Publication No. S59-071902

SUMMARY OF INVENTION

Technical Problems

Bolt members for fixing a flow guide to a casing are provided with measures for preventing falling out such as welding the bolt head or using a locking pin. However, work space for implementing these measures may be narrow depending on the fixing location of the flow guide, the tightening direction of the bolt member, and the like, and it may not be possible to sufficiently implement the measures for preventing falling out of the bolt member. Additionally, even if measures for preventing falling out such as welding the bolt head or using a locking pin are implemented, the thickness of the wall at the location where the measure is implemented will be reduced due to the working fluid flowing in the casing. Consequently, with conventional measures for preventing bolt members from falling out, long-term operation of the turbine may lead to the bolt members falling out and flying around in the casing. Moreover, because the turbine housed in the casing is rotating at a high speed, the turbine blade may become damaged by the bolt members that are flying around.

An object of an aspect of the present invention is to provide a bolt fall-out preventing structure whereby bolt members can be prevented from falling out.

Solution to Problem

According to an aspect of the present invention, a bolt fall-out preventing structure is provided that includes: a first member including a first portion and a second portion, a first hole being formed in the first portion and the second portion; a first bolt member including a first head portion inserted into the first hole of the first member and disposed on the second portion, the first bolt member fixing the first member to a support member; a second member including a third portion and a fourth portion, a second hole being formed in the third portion and the fourth portion, the second member engaging with the first member; a second bolt member including a second head portion that opposes the first head portion when the second bolt member is inserted into the second hole of the second member and the first member and the second member are engaged; and a wall portion on the second head portion of the second bolt member, the wall portion being disposed between a side surface of the first head portion and an inner surface of the second portion.

According to the aspect of the present invention, the first member is fixed to the support member by the first bolt member, which is inserted into the first hole of the first member. The second bolt member is joined to the second member by being inserted into the second hole of the second member. The second member engages with the first member. As such, changes in relative positions of the first member and the second member are suppressed. The second bolt member is joined to the second member. When the second member is engaged with the first member, the second head portion of the second bolt member opposes the first head portion of the first bolt member. As such, changes in relative positions of the first member, the first bolt member, the second member, and the second bolt member are suppressed. Additionally, changes in the position of the first bolt member are suppressed. The second head portion includes the wall portion disposed between the side surface of the first head portion and the inner surface of the second portion of the first member. Changes in the position of the first member are suppressed by the wall portion. Thus, movement of the first bolt member is suppressed and, as a result, the first bolt member is prevented from falling out.

In the aspect of the present invention, a configuration is possible in which the first member includes: an outer surface formed around an end portion opening of the first portion, the outer surface opposing the support member; a recessed portion in communication with an end portion opening of the second portion; and a support surface supporting the second member on an inner surface of the recessed portion.

As a result of this configuration, the first member that opposes the support member is fixed by the first bolt member. Additionally, the second member is disposed in the recessed portion. Moreover, the end portion opening of the second portion communicates with the recessed portion. As a result, the first head portion of the first bolt member disposed in the second portion and the second head portion of the second bolt member joined to the second member are opposable.

In the aspect of the present invention, a configuration is possible in which the first member includes an inlet through which the second member is inserted in a direction parallel to the support surface, and a positioning member positioning the second member inserted through the inlet.

As a result of this configuration, the second member that is joined to the second bolt member can be moved into the recessed portion through the inlet. The second member that has been moved into the recessed portion is positioned by the positioning member.

In the aspect of the present invention, a configuration is possible in which the first bolt member includes a first groove which is provided in the first head portion and in which a tool is mounted.

As a result of this configuration, the first bolt member can be moved by operating the tool disposed in the first groove.

In the aspect of the present invention, a configuration is possible in which the bolt fall-out preventing structure further includes a closing member configured to close an end portion opening of the third portion.

As a result of this configuration, the end surface of the second member can be made smooth.

In the aspect of the present invention, a configuration is possible in which the bolt fall-out preventing structure further includes a fixing member fixing the second bolt member to an inner surface of the third portion.

As a result of this configuration, rotation of the second bolt member is suppressed.

In the aspect of the present invention, a configuration is possible in which the second bolt member includes a second groove which is provided in the second head portion and in which a tool is disposed.

As a result of this configuration, the second bolt member can be moved by operating the tool inserted through the opening in the end portion of the fourth portion and disposed in the second groove.

In the aspect of the present invention, a configuration is possible in which the first member includes a flow guide including a steam guide surface facing an internal space in which a rotor of a steam turbine is disposed; and the support member includes at least a portion of a casing of the steam turbine.

As a result of this configuration, the bolt is prevented from falling out into the internal space, which is a steam flow path, and, as such, declines in the performance of the steam turbine can be suppressed.

Advantageous Effects of Invention

According to the aspect of the present invention, a bolt fall-out preventing structure can be provided whereby bolts can be prevented from falling out.

DESCRIPTION OF EMBODIMENTS

Embodiments according to the present invention will be described below with reference to the accompanying drawings. However, the present invention is not limited to the embodiments. The constituent elements of the embodiments described below can be combined with each other as desired. Furthermore, some constituent elements may not be used in some cases.

In the following description, for convenience, an XYZ Cartesian coordinate system is set, and positional relationships of constituents are described while referencing this XYZ Cartesian coordinate system. Herein, a direction parallel to the X-axis in a predetermined plane is defined as an "X-axis direction", a direction orthogonal to the X-axis and parallel to the Y-axis in the predetermined plane is defined as a "Y-axis direction", and a direction orthogonal to both the X-axis and the Y-axis and parallel to the Z-axis is defined as a "Z-axis direction".

Additionally, a direction parallel to a rotation axis AX of a rotor is referred to as an "axial direction", a radiating direction from the rotation axis AX of the rotor is referred to as a "radial direction", and a rotational direction about the rotation axis AX of the rotor is referred to as a "circumferential direction". In the present embodiment, the X-axis and the rotation axis AX are parallel to each other. Additionally, the X-axis direction matches the axial direction. Moreover, the Y-axis direction and the Z-axis direction match the radial direction.

Figure 1:
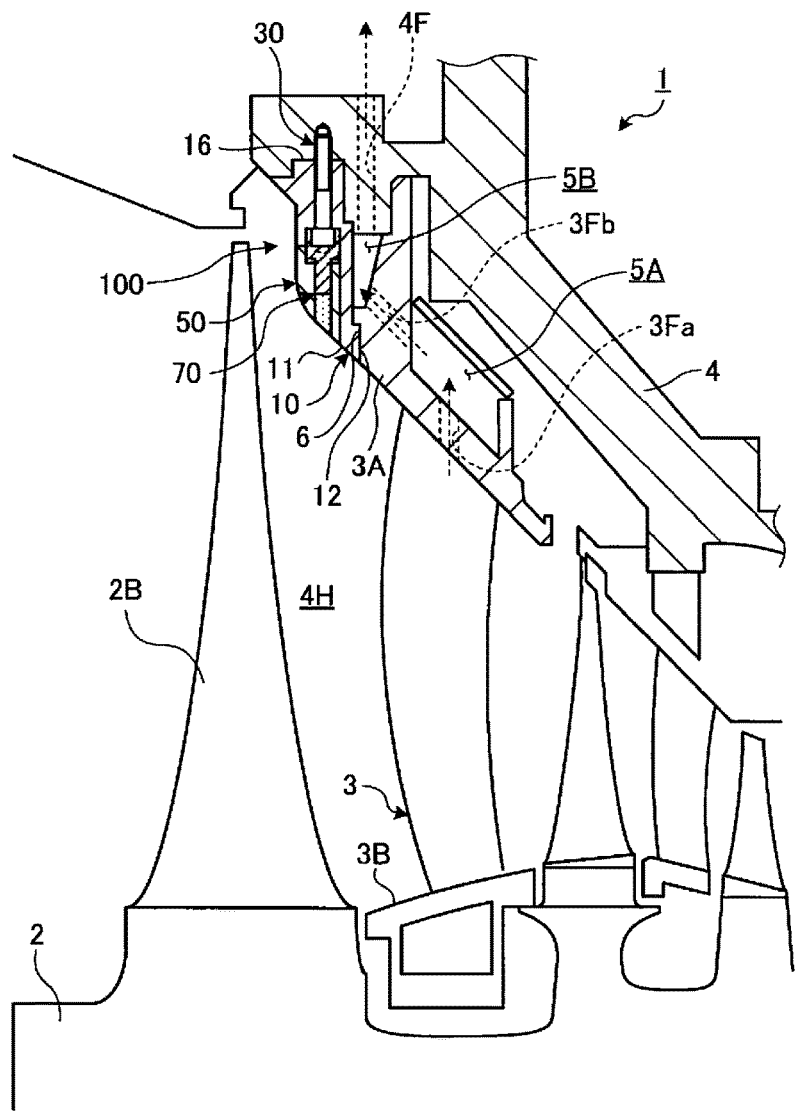
FIG. 1 is a cross-sectional view schematically illustrating a portion of a steam turbine according to an embodiment of the present invention.

FIG. 1 is a cross-sectional view schematically illustrating a portion of a steam turbine 1 according to the present embodiment. As illustrated in FIG. 1, the steam turbine 1 includes a rotor 2, blades 2B, vanes 3, an inner casing 4 housing the rotor 2, and a flow guide 10 that is provided inside the inner casing 4 and guides steam. Additionally, an outer casing (not illustrated in the drawings) is provided around the inner casing 4. FIG. 1 is a cross-sectional view of the steam turbine 1 near the last stage blade 2B and vane 3.

The rotor 2 is supported rotatably on a bearing device, and rotates about the rotation axis AX. The blades 2B are fixed to the outer periphery of the rotor 2. The vanes 3 are fixed along the circumferential direction so as to connect an outer ring 3A to an inner ring 3B, which are ring-shaped members. The vanes 3 are arranged around the rotor 2 by the outer ring 3A being fixed to the inner casing 4. The vanes 3 and the blades 2B are disposed alternately at predetermined intervals along the axial direction. Note that a space 5A is formed in the outer ring 3A of the vanes 3.

The rotor 2 is housed in an internal space 4H of the inner casing 4. Steam is supplied to the internal space 4H of the inner casing 4, and the supplied steam flows in the axial direction. The rotor 2 is rotationally driven as a result of the steam, which flows in the axial direction in the inner casing 4, passing by the blades 2B and the vanes 3. The rotor 2 is connected to a power generator and can generate power by driving this power generator. The steam flowing in the inner casing 4 is discharged from the inner casing 4 after passing by the last stage vane 3 and the last stage blade 2B.

The flow guide 10 forms a ring shape in the radial direction of the rotation axis AX and, in the internal space 4H of the inner casing 4, guides the steam flowing in the inner casing 4. The flow guide 10 is disposed along the axial direction between the last stage vane 3 and the last stage blade 2B, and includes a guide surface 11 that faces the internal space 4H. The flow guide 10 guides the steam so that the steam is supplied from the last stage vane 3 to the last stage blade 2B.

As illustrated in FIG. 1, the flow guide 10 is disposed on a downstream side in the axial direction (−X side) of the last stage vane 3, and is fixed to the inner casing 4 such that an end surface 12 on an upstream side in the axial direction (+X side) contacts an end surface 6 of the outer ring 3A. In the present embodiment, the flow guide 10 is fixed to the inner casing 4 by a bolt fall-out preventing structure 100. Note that a space 5B is formed in at least a portion of the flow guide 10, between the flow guide 10 and the inner casing 4.

A slit (not illustrated in the drawings) is formed in a surface of the last stage vane 3, and moisture contained in the steam is collected from this slit. The collected moisture is sent to the space 5A between the outer ring 3A and the inner casing 4, via a flow path 3Fa provided in the outer ring 3A. The moisture sent to the space 5A is sent to the space 5B between the flow guide 10 and the inner casing 4, via a flow path 3Fb provided in the outer ring 3A. The moisture sent to the space 5B is discharged via a flow path 4F provided in the inner casing 4.

Figure 2:
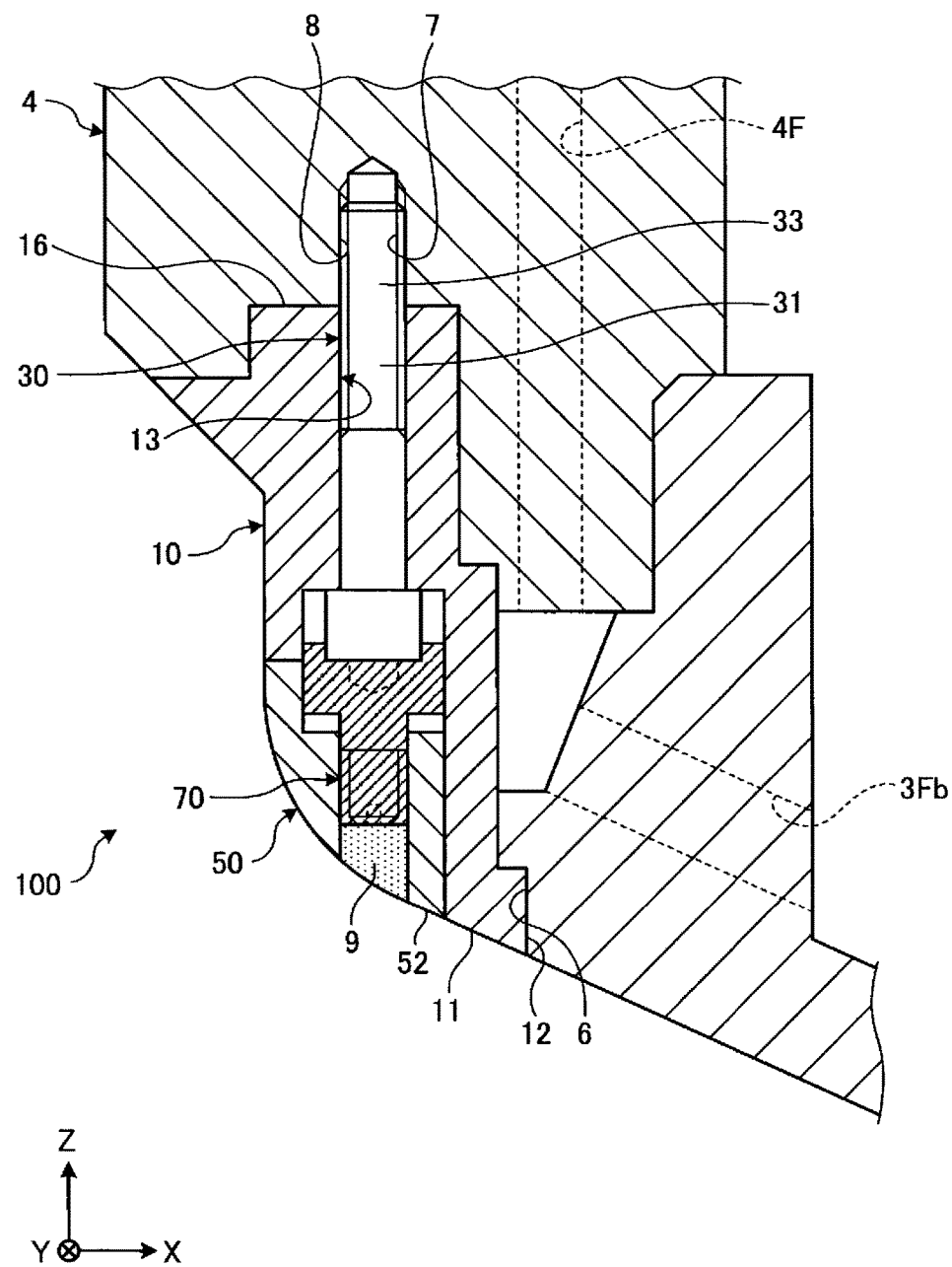
FIG. 2 is a cross-sectional view illustrating an example of a bolt fall-out preventing structure according to the embodiment of the present invention.

FIG. 2 is a cross-sectional view schematically illustrating an example of the bolt fall-out preventing structure 100 according to the present embodiment. FIG. 2 corresponds to a partial, enlarged view of FIG. 1. In the present embodiment, the flow guide 10 is fixed to the inner casing 4 (support member) by the bolt fall-out preventing structure 100 that includes a first bolt member 30. The bolt fall-out preventing structure 100 of the present embodiment prevents the first bolt member 30 from falling out from the inner casing 4 and also prevents the first bolt member 30 from being damaged. As such, the flow guide 10 can be stably fixed to the inner casing 4 by the bolt fall-out preventing structure 100.

As illustrated in FIGS. 1 and 2, the bolt fall-out preventing structure 100 applied to the flow guide 10 of the steam turbine 1 includes the flow guide 10 (first member), the first bolt member 30 fixing the flow guide 10 to the inner casing 4 (support member), a fixing member 50 (second member) that engages with the flow guide 10, and a second bolt member 70 that joins to the fixing member 50.

Figure 3:
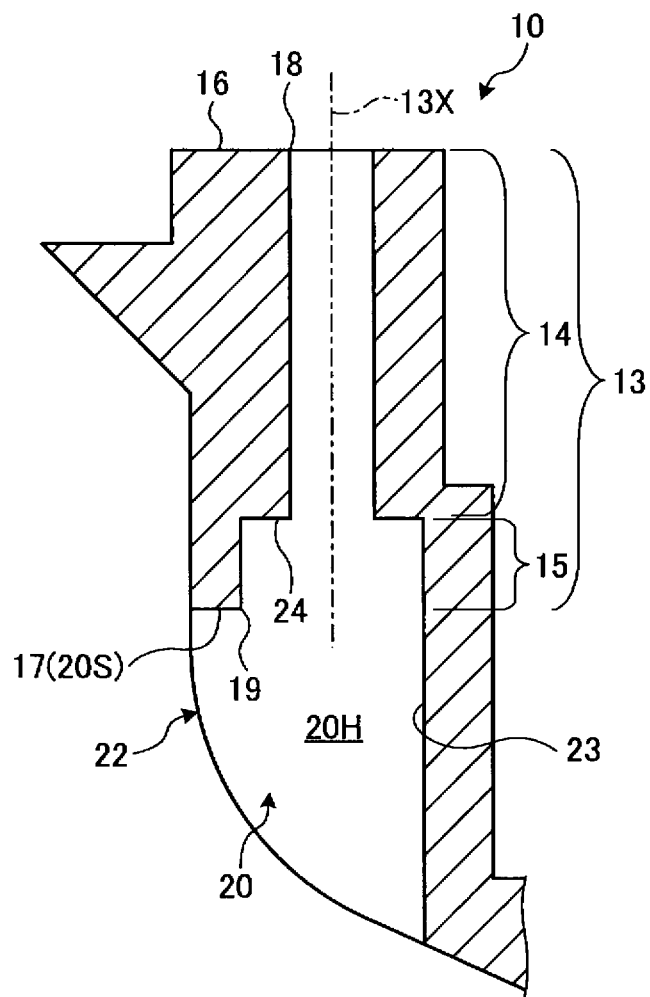
FIG. 3 is a cross-sectional view illustrating an example of the bolt fall-out preventing structure according to the embodiment of the present invention.
Figure 4:
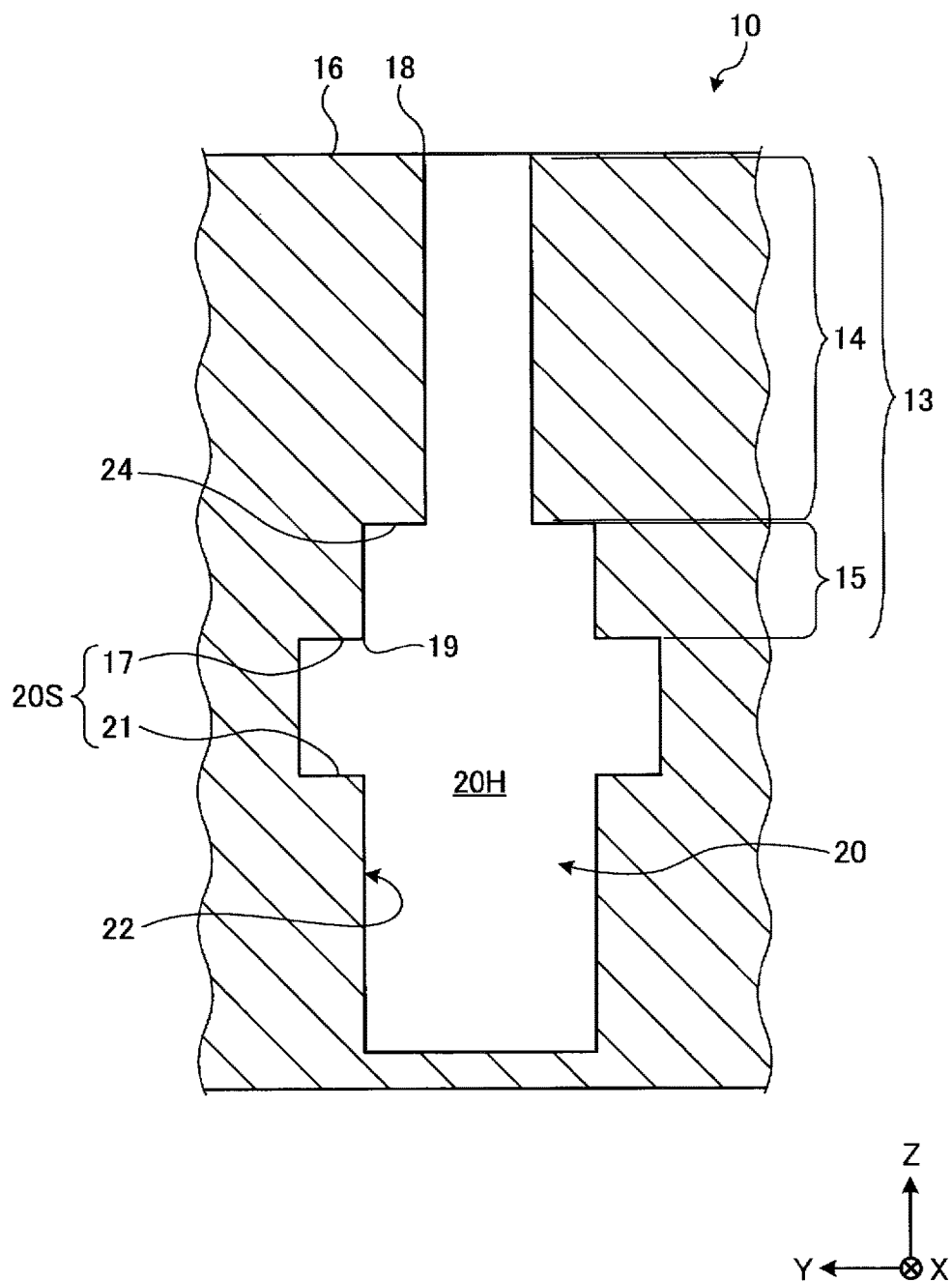
FIG. 4 is a front view illustrating an example of the bolt fall-out preventing structure according to the embodiment of the present invention.

FIG. 3 is a cross-sectional view parallel to the XZ plane and illustrates a portion of the flow guide 10 according to the present embodiment. FIG. 4 is a front view of a portion of the flow guide 10 according to the present embodiment, viewed from the −X side.

As illustrated in FIGS. 2, 3, and 4, the flow guide 10 includes a first hole 13 into which the first bolt member 30 is inserted. The first hole 13 is formed in the radial direction of the rotation axis AX, and includes a first portion 14 and a second portion 15. The first portion 14 is provided outwards in the radial direction from the second portion 15. A boundary surface 24 is formed at the boundary between the first portion 14 and the second portion 15.

The first portion 14 has a circular shape and the second portion 15 also has a circular shape in a plane orthogonal to a central axis 13X of the first hole 13. An inner diameter of the circular shape of the second portion 15 is greater than an inner diameter of the circular shape of the first portion 14. The center of the first portion 14 matches the center of the second portion 15 in the plane orthogonal to the central axis 13X of the first hole 13.

The flow guide 10 includes an outer surface 16 that opposes the inner casing 4 and an inner surface 17 that opposes the outer surface 16. The first hole 13 is formed between the outer surface 16 and the inner surface 17 that oppose each other. The outer surface 16 is formed around an opening 18 of an end portion of the first hole 13, and the inner surface 17 is formed around an opening 19 of an end portion of the first hole 13. The opening 18 is positioned outwards in the radial direction of the rotation axis AX from the opening 19. Note that the opening 18 is also an opening of an end portion of the first portion 14 of the first hole 13, and the opening 19 is also an opening of an end portion of the second portion 15 of the first hole 13.

Furthermore, the flow guide 10 includes a recessed portion 20. The recessed portion 20 includes a space 20H that communicates with the opening 19 of the end portion of the second portion 15. As such, the space 20H of the recessed portion 20 communicates with the internal space of the first hole 13. The recessed portion 20 includes an inner surface 20S, and the inner surface 20S shares the inner surface 17 of the flow guide 10. Additionally, the inner surface 20S of the recessed portion 20 includes a support surface 21 that supports the fixing member 50. The inner surface 17 and the support surface 21 oppose each other across a gap. The flow guide 10 includes an opening 22 provided on a first end portion (end portion on the −X side) of the recessed portion 20, and a wall surface 23 provided on a second end portion (end portion on the +X side) of the recessed portion 20.

Figure 5:
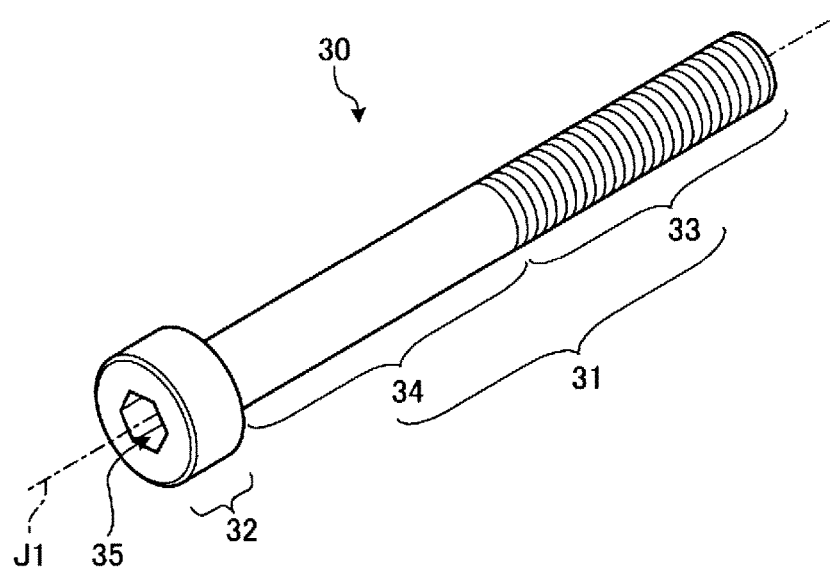
FIG. 5 is a drawing illustrating an example of a first bolt member according to the embodiment of the present invention.

FIG. 5 is a drawing illustrating an example of the first bolt member 30 according to the present embodiment. As illustrated in FIG. 5, the first bolt member 30 includes a first shaft portion 31 and a first head portion 32. The first shaft portion 31 includes a threaded portion 33 on which male threads are formed, and a cylindrical portion 34. The threaded portion 33 is disposed farther to the leading end side of the first shaft portion 31 than the cylindrical portion 34. The cylindrical portion 34 is disposed between the first head portion 32 and the threaded portion 33. Additionally, the first bolt member 30 has an axis (central axis) J1. An outline of the first head portion 32 is circular in a plane orthogonal to the axis J1.

In the present embodiment, the first bolt member 30 includes a first groove 35 in the first head portion 32, in which a tool is mounted. An outline of the first groove 35 is hexagonal in the plane orthogonal to the axis J1. That is, in the present embodiment, the first bolt member 30 is a hexagon socket head bolt, and a tool such as a hexagon socket screw key can be mounted in the first groove 35. The flow guide 10 can be fixed to the inner casing 4 by operating the tool and rotating the first bolt member 30 that is inserted into the first hole 13.

Figure 6:
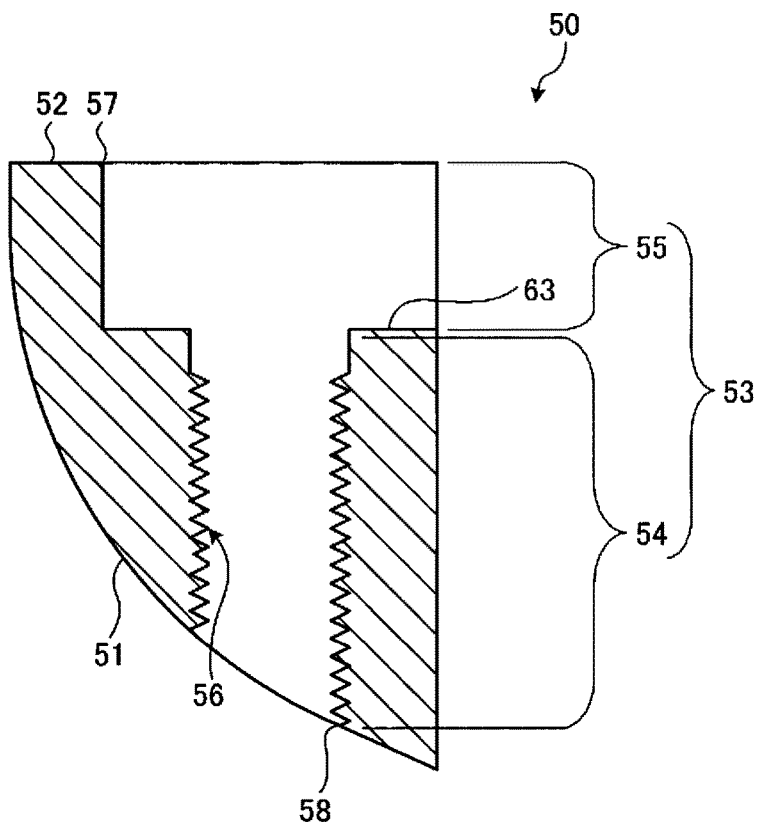
FIG. 6 is a cross-sectional view illustrating an example of a fixing member according to the embodiment of the present invention.
Figure 6:
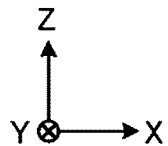
Figure 7:
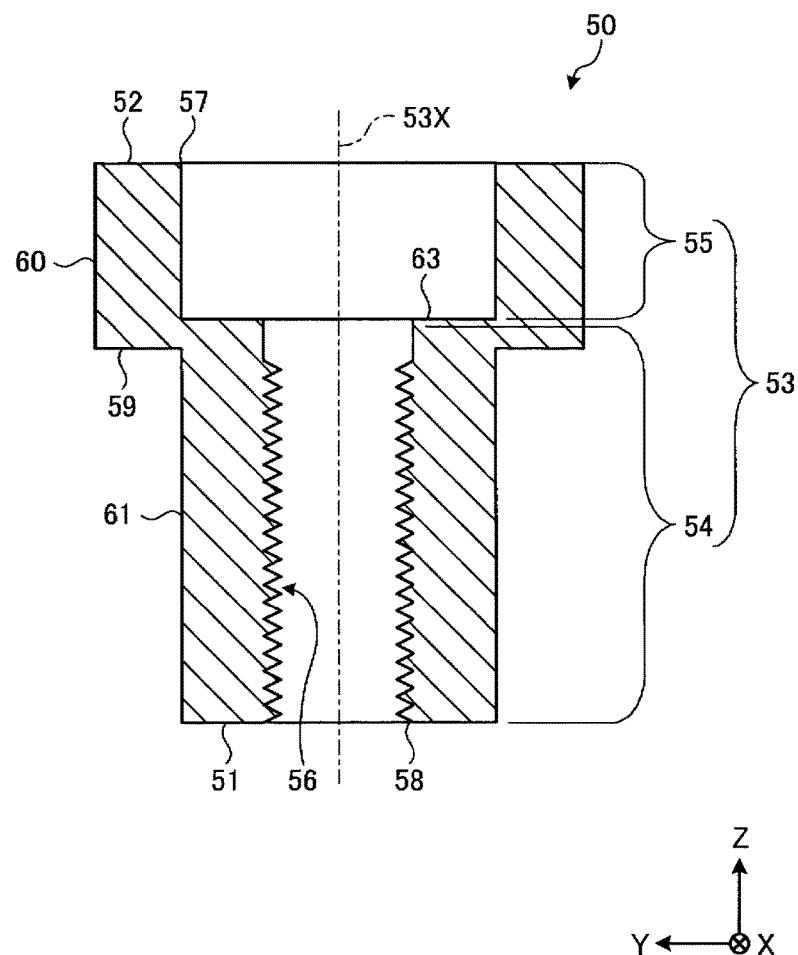
FIG. 7 is a cross-sectional view illustrating an example of the fixing member according to the embodiment of the present invention.

FIG. 6 is a cross-sectional view parallel to the XZ plane and illustrates an example of the fixing member 50 according to the present embodiment. FIG. 7 is a cross-sectional view parallel to the YZ plane and illustrates an example of the fixing member 50 according to the present embodiment.

As illustrated in FIGS. 6 and 7, the fixing member 50 includes a second hole 53 into which the second bolt member 70 is inserted. The second hole 53 is formed in the radial direction of the rotation axis AX, and includes a third portion 54 and a fourth portion 55. The fourth portion 55 is provided outwards in the radial direction from the third portion 54. A boundary surface 63 is formed at the boundary between the third portion 54 and the fourth portion 55. Note that, as illustrated in FIG. 6, a notched portion is provided on a portion of the fourth portion 55 of the fixing member 50.

In the present embodiment, the third portion 54 is circular in a plane orthogonal to a central axis 53X of the second hole 53. A threaded portion 56 is formed on an inner surface of the third portion 54. The fourth portion 55 has a substantially circular shape in the plane orthogonal to the central axis 53X of the second hole 53. An inner diameter of the circular shape of the fourth portion 55 is greater than an inner diameter of the circular shape of the third portion 54. Additionally, the center of the third portion 54 matches the center of the fourth portion 55 in the plane orthogonal to the central axis 53X of the second hole 53.

The fixing member 50 includes a first end surface 51 and a second end surface 52. The first end surface 51 is formed around an opening 58 of an end portion of the second hole 53, and the second end surface 52 is formed around an opening 57 of the end portion of the second hole 53. The opening 57 is positioned outwards in the radial direction of the rotation axis AX from the opening 58. Additionally, the fixing member 50 includes an opposing surface 59 that opposes the support surface 21 of the flow guide 10, and also includes a first side surface 60 and a second side surface 61. Note that the opening 58 of the second hole 53 is also an opening of an end portion of the third portion 54 of the second hole 53, and the opening 57 of the second hole 53 is also an opening of an end portion of the fourth portion 55 of the second hole 53.

Figure 8:
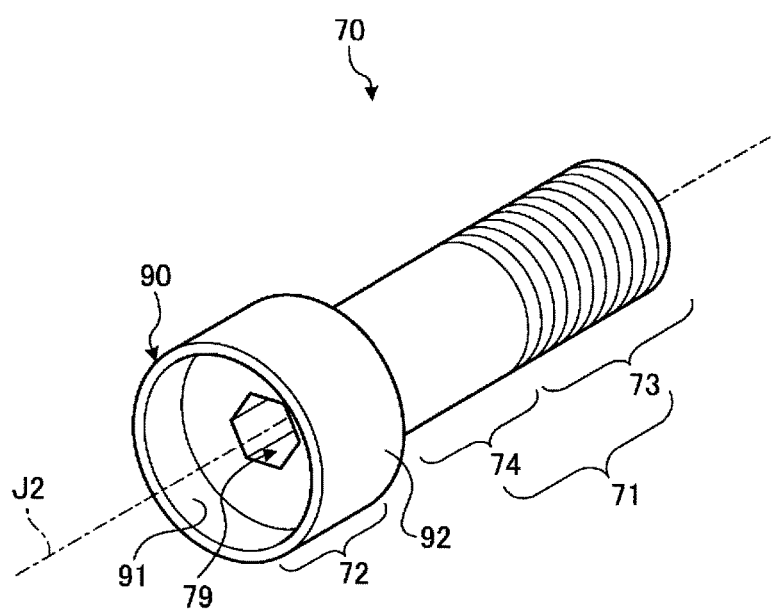
FIG. 8 is a cross-sectional view illustrating an example of a second bolt member according to the embodiment of the present invention.
Figure 9:
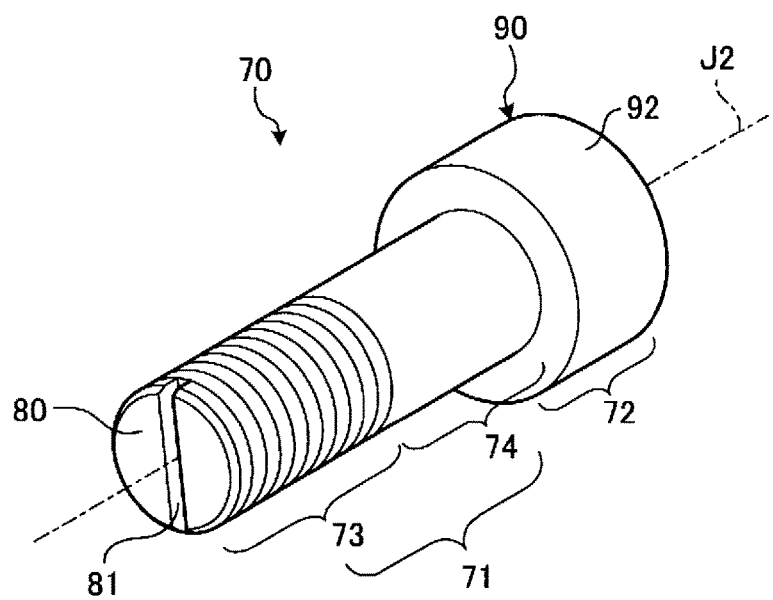
FIG. 9 is a cross-sectional view illustrating an example of the second bolt member according to the embodiment of the present invention.

FIGS. 8 and 9 are drawings illustrating an example of the second bolt member 70 according to the present embodiment. As illustrated in FIGS. 8 and 9, the second bolt member 70 includes a second shaft portion 71 and a second head portion 72. The second shaft portion 71 includes a threaded portion 73 on which male threads are formed, and a cylindrical portion 74. The threaded portion 73 is disposed farther to the leading end side of the second shaft portion 71 than the cylindrical portion 74. The cylindrical portion 74 is disposed between the second head portion 72 and the threaded portion 73. Additionally, the second bolt member 70 has an axis (central axis) J2. An outline of the second head portion 72 is circular in a plane orthogonal to the axis J2.

In the present embodiment, the second bolt member 70 includes a second groove 79 in the second head portion 72, in which a tool is mounted. An outline of the second groove 79 is hexagonal in the plane orthogonal to the axis J2. That is, in the present embodiment, the second bolt member 70 is a hexagon socket head bolt, and a tool such as a hexagon socket screw key can be mounted in the second groove 79. The second bolt member 70 can be screwed into the second hole 53 by operating this tool.

The second bolt member 70 includes a third groove 81 in a leading end surface 80 of the second shaft portion 71, in which a tool is mounted. The third groove 81 has a slit shape in the plane orthogonal to the axis J2, and a tool such as a screwdriver can be mounted in the third groove 81. The second bolt member 70 can be rotated by operating this tool. Note that the third groove 81 may have a different shape such as, for example, a hexagonal shape.

In the present embodiment, the second head portion 72 of the second bolt member 70 includes a wall portion 90 protruding from the second head portion 72. The wall portion 90 includes an inner surface 91 facing the axis J2 and an outer surface 92 opposite the inner surface 91. The inner surface 91 of the wall portion 90 has a circular shape and, also, the outer surface 92 of the wall portion 90 has a circular shape in the plane orthogonal to the axis J2.

Figure 10:
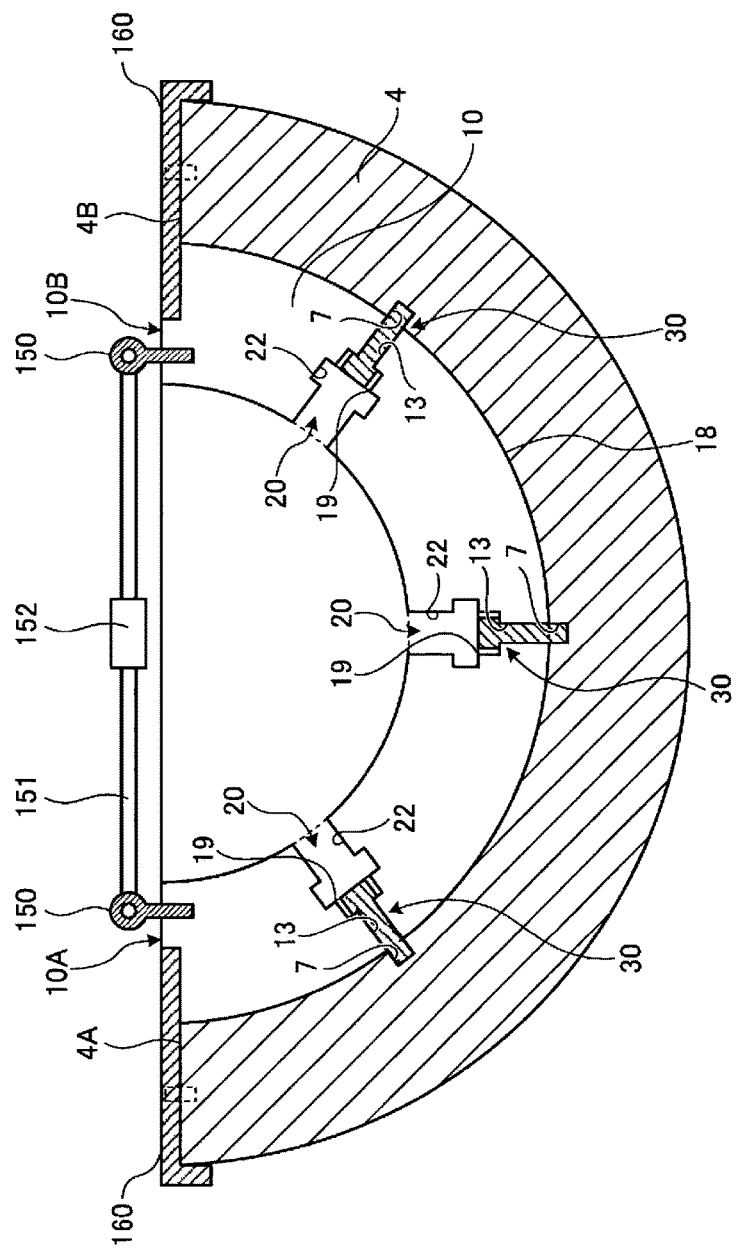
FIG. 10 is a drawing for explaining an example of an assembly method of the bolt fall-out preventing structure according to the embodiment of the present invention.

Next, a description is given of an example of an assembly method of the bolt fall-out preventing structure 100 according to the present embodiment. FIG. 10 is a schematic view of the inner casing 4 and the flow guide 10 according to the present embodiment, viewed from the −X side. FIG. 10 illustrates a state in which the flow guide 10 is fixed to the inner casing 4 using the first bolt member 30. Additionally, FIG. 10 illustrates a state in which half (the top half or the bottom half) of the flow guide 10 is fixed to half (the top half or the bottom half) of the inner casing 4.

In the present embodiment, when the flow guide 10 is fixed to the inner casing 4 using the first bolt member 30, a process is appropriately carried out to correct the shape of the flow guide 10. The flow guide 10 is more likely to deform than the inner casing 4 and, as such, in cases where the flow guide 10 is deformed, a process for correcting the shape of the flow guide 10 becomes necessary.

The process for correcting the shape of the flow guide 10 includes fixing a protruding member 150 to each of a first end portion 10A and a second end portion 10B of the flow guide 10, correcting the shape of the flow guide 10 by applying force to the protruding members 150, and supporting the shape-corrected flow guide 10 using a support member 160. In the present embodiment, the protruding member 150 is an eye bolt, for example, and includes a ring portion on a head portion thereof. This eye bolt is fixed to each of the end portions 10A and 10B of the flow guide 10.

For example, in cases where the shape of the flow guide 10 is corrected so as to bring the end portion 10A and the end portion 10B closer to each other in the radial direction, the protruding member 150 (the ring portion of the eye bolt) fixed to the end portion 10A and the protruding member 150 (the ring portion of the eye bolt) fixed to the end portion 10B are connected by a wire member 151 as illustrated in FIG. 10. A tension adjusting device 152 such as a turnbuckle is provided on the wire member 151, and the tension of the wire member 151 is adjusted by this tension adjusting device 152. The shape of the flow guide 10 is corrected so as to bring the end portion 10A and the end portion 10B closer to each other due to the wire member 151 being stretched by the tension adjusting device 152.

In cases where the shape of the flow guide 10 is corrected so as to separate the end portion 10A and the end portion 10B from each other in the radial direction, the protruding member 150 (the ring portion of the eye bolt) fixed to the end portion 10A and a ring portion of an eye bolt (not illustrated in the drawings) fixed to a member disposed outside of the flow guide 10 and the inner casing 4 are connected by a wire member. Additionally, the protruding member 150 (the ring portion of the eye bolt) fixed to the end portion 10B and a ring portion of an eye bolt (not illustrated in the drawings) fixed to a member disposed outside of the flow guide 10 and the inner casing 4 are connected by a wire member. A tension adjusting device such as a turnbuckle is provided on each of these wire members, and the tension of the wire members is adjusted by these tension adjusting devices. The shape of the flow guide 10 is corrected so as to separate the end portion 10A and the end portion 10B from each other due to the wire members being stretched by the tension adjusting devices.

After the shape of the flow guide 10 has been corrected, the flow guide 10 is placed at a predetermined position of the inner casing 4, and the end portion 10A and the end portion 10B are supported by the support member 160. The support member 160 is fixed to each of a first end portion 4A and a second end portion 4B of the inner casing 4 by bolt members or the like. The support member 160 fixed to the end portion 4A supports the end portion 10A of the flow guide 10. The support member 160 fixed to the end portion 4B supports the end portion 10B of the flow guide 10. Thus, re-deformation of the flow guide 10 that has been shape-corrected is suppressed.

Additionally, in the present embodiment, a hole 7 in the inner casing 4 and the first hole 13 in the flow guide 10 are aligned as a result of correcting the shape of the flow guide 10. After the hole 7 in the inner casing 4 and the first hole 13 in the flow guide 10 have been aligned, the flow guide 10 is supported by the support member 160 and, as a result, the relative positions of the hole-4 7 in the inner casing 4 and the first hole 13 in the flow guide 10 are maintained.

After the hole 7 in the inner casing 4 and the first hole 13 in the flow guide 10 have been aligned, the first bolt member 30 is inserted into the first hole 13 through the opening 19. A plurality of first holes 13 are provided in the flow guide 10.

The first bolt member 30 is inserted into the first hole 13 and the threaded portion 33 of the first shaft portion 31 is disposed in the hole 7 in the inner casing 4. In this state, the first bolt member 30 is rotated using the tool. In the present embodiment, the flow guide 10 is fixed to the inner casing 4 by the first bolt member 30 by mounting the tool in the first groove 35 provided in the first head portion 32 of the first bolt member 30 and rotating the first bolt member 30. Thus, as illustrated in FIG. 10, the flow guide 10 is fixed to the inner casing 4 by a plurality of first bolt members 30.

Figure 11:
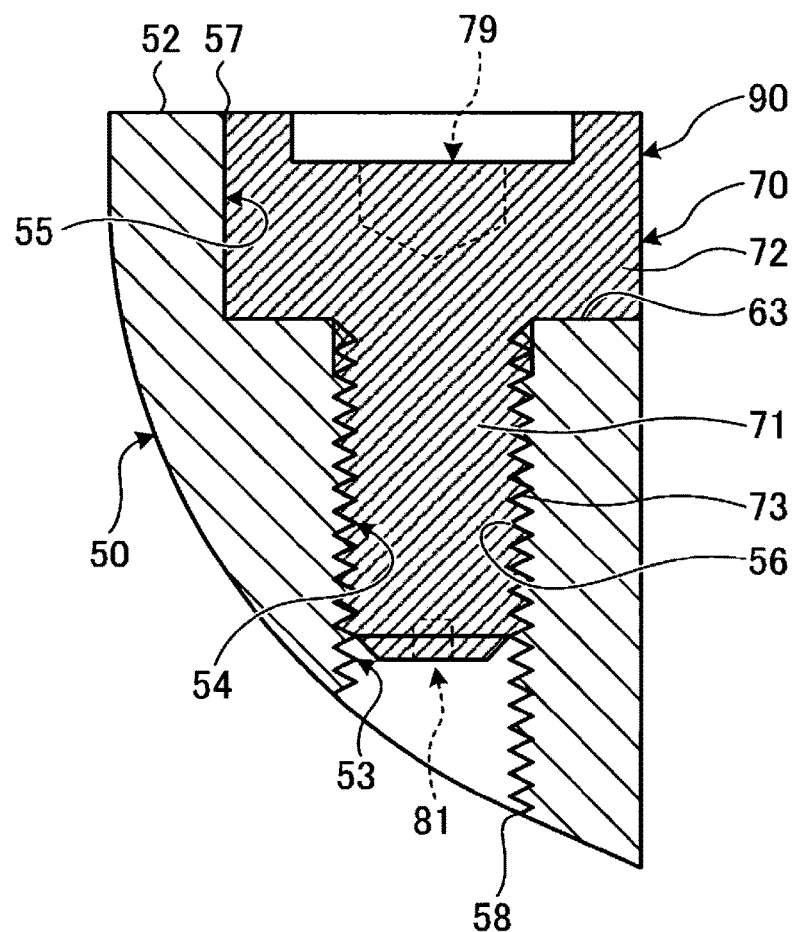
FIG. 11 is a drawing for explaining an example of the assembly method of the bolt fall-out preventing structure according to the embodiment of the present invention.

FIG. 11 is a drawing illustrating a state in which the fixing member 50 and the second bolt member 70 are joined. The second bolt member 70 is joined to the fixing member 50 prior to the fixing member 50 being engaged in the recessed portion 20 of the flow guide 10. When the second bolt member 70 is joined to the fixing member 50, the leading end of the second shaft portion 71 of the second bolt member 70 is inserted into the internal space of the second hole 53 through the opening 57 of the second hole 53.

After the second bolt member 70 has been inserted into the second hole 53, the tool is mounted in the second groove 79 provided in the second head portion 72 of the second bolt member 70, and the second bolt member 70 is rotated. The second bolt member 70 is tightened in the second hole 53 until the threaded portion 73 is screwed into the threaded portion 56 of the fixing member 50 and the second head portion 72 contacts the boundary surface 63 of the fixing member 50. As a result, the second bolt member 70 and the fixing member 50 are joined as illustrated in FIG. 11.

Figure 12:
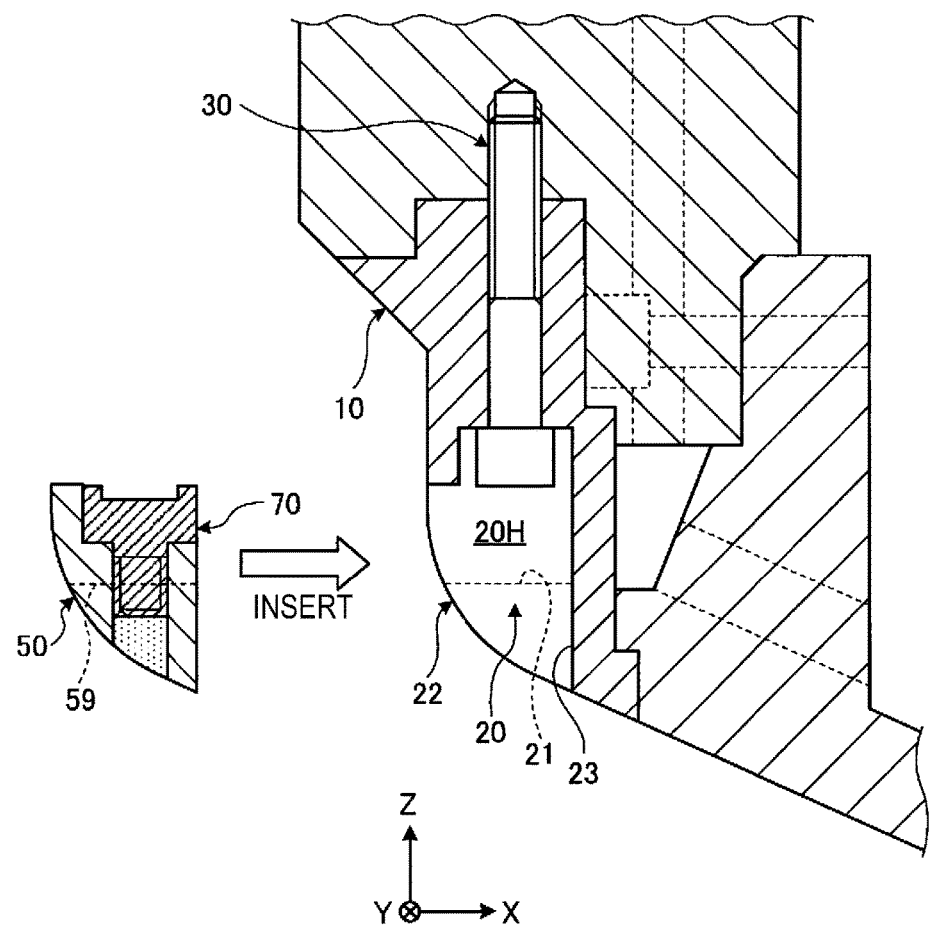
FIG. 12 is a drawing for explaining an example of the assembly method of the bolt fall-out preventing structure according to the embodiment of the present invention.

After the flow guide 10 is fixed to the inner casing 4 by the first bolt member 30 and the second bolt member 70 and the fixing member 50 are joined, the fixing member 50 to which the second bolt member 70 is joined is engaged with the recessed portion 20 of the flow guide 10 as illustrated in FIG. 12. The inner surface 20S of the recessed portion 20 of the flow guide 10 includes the support surface 21 that supports the opposing surface 59 of the fixing member 50.

As illustrated in FIG. 12, in cases where the support surface 21 is parallel to the XY plane, the opening 22 is provided in a first end portion (the end portion on the −X side) of the recessed portion 20. The fixing member 50 can be inserted in a direction parallel to the support surface 21 through the opening 22 into the space 20H inside the recessed portion 20. In the present embodiment, the opening 22 functions as an inlet for inserting the fixing member 50 into the space 20H.

The opposing surface 59 of the fixing member 50, which has been inserted through the opening 22 into the space 20H of the recessed portion 20, can be made to slide in the +X direction on the support surface 21. The fixing member 50 is engaged with the recessed portion 20 of the flow guide 10 by moving the fixing member 50 until it contacts the wall surface 23. As a result, movement in the X-axis direction of the fixing member 50 is restricted, and the position of the fixing member 50 is set. Additionally, the first side surface 60 and the second side surface 61 of the fixing member 50 contact the inner surface 20S of the recessed portion 20. As a result, movement in the Y-axis direction of the fixing member 50 is restricted, and the position of the fixing member 50 is set. Furthermore, the opposing surface 59 of the fixing member 50 is supported by the support surface 21 of the inner surface 20S of the recessed portion 20. As a result, movement in the Z-axis direction of the fixing member 50 is restricted, and the position of the fixing member 50 is set.

Figure 13:
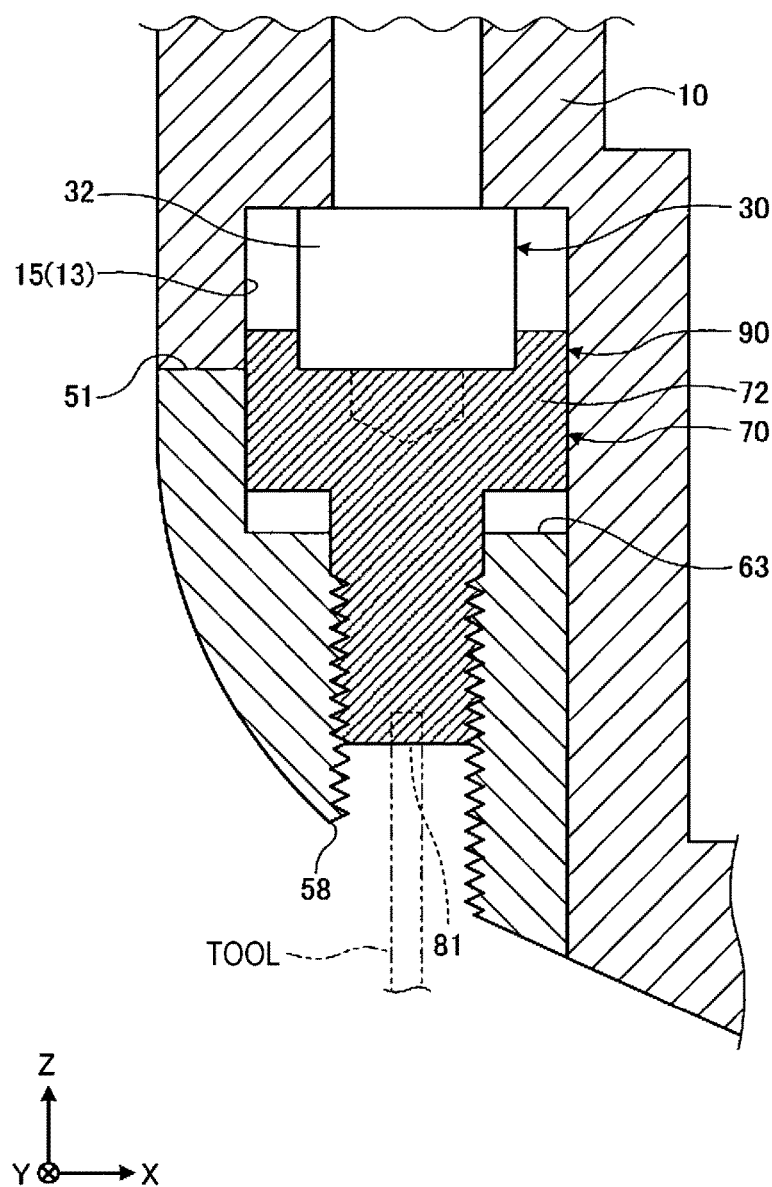
FIG. 13 is a drawing for explaining an example of the assembly method of the bolt fall-out preventing structure according to the embodiment of the present invention.

After the fixing member 50 has been engaged, the tool inserted through the opening 58 is mounted in the third groove 81 provided in the leading end surface 80 of the second bolt member 70 as illustrated in FIG. 13. The tool is operated and the second bolt member 70 is rotated so that the second head portion 72 separates from the boundary surface 63 and the wall portion 90 protrudes from the first end surface 51.

As a result, as illustrated in FIG. 13, the second head portion 72 of the second bolt member 70 contacts the first head portion 32 of the first bolt member 30 and, also, the wall portion 90 of the second head portion 72 is fit between the side surface of the first head portion 32 and the inner surface of the second portion 15 of the flow guide 10. Thus, the first bolt member 30 is restrained by the wall portion 90 disposed between the side surface of the first head portion 32 and the inner surface of the second portion 15.

Figure 14:
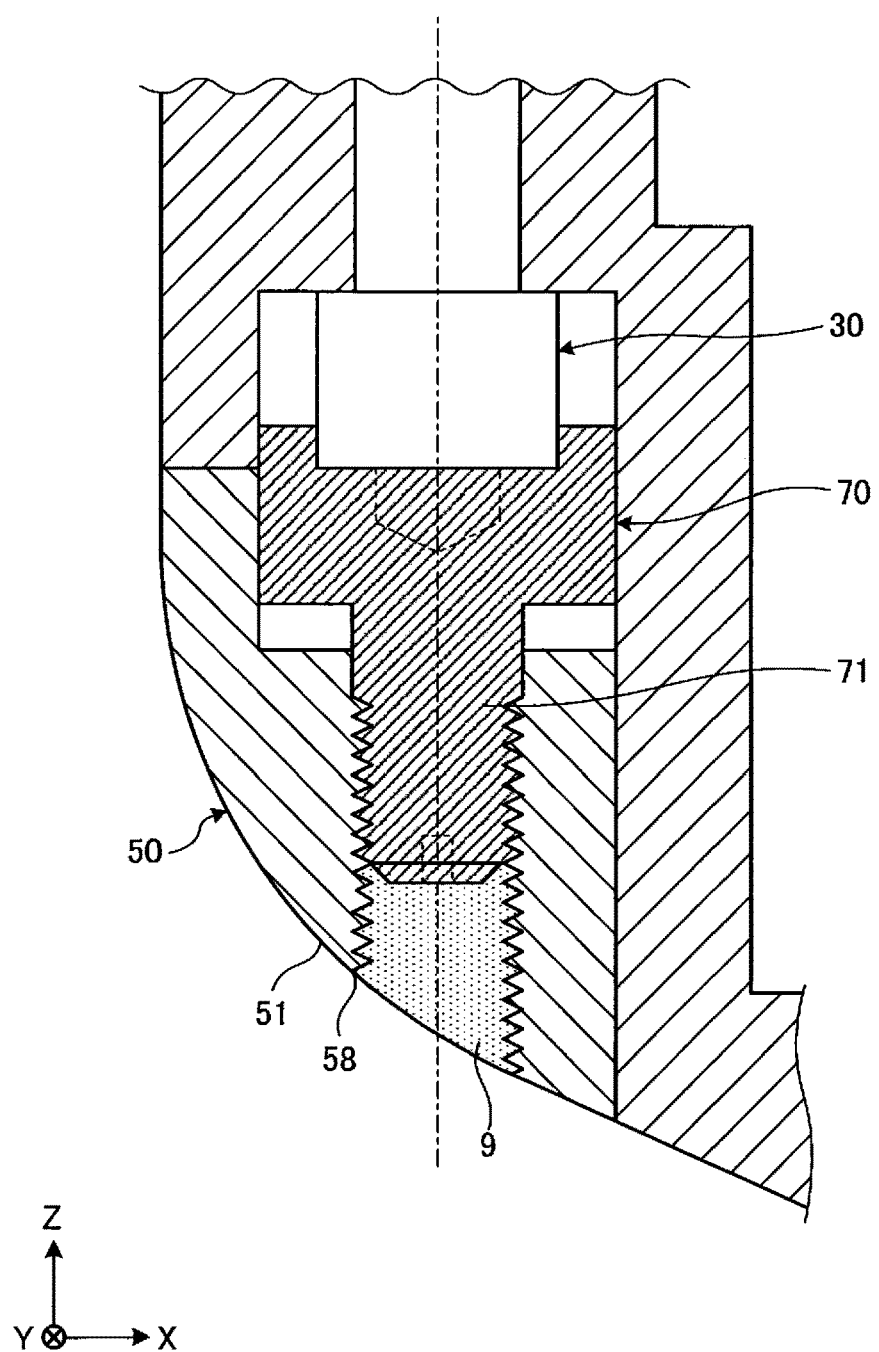
FIG. 14 is a drawing for explaining an example of the assembly method of the bolt fall-out preventing structure according to the embodiment of the present invention.

After the first bolt member 30 has been restrained by the second bolt member 70, the opening 58 is closed by a fixing member 9 as illustrated in FIG. 14. In the present embodiment, the inner surface of the second hole 53 and the second shaft portion 71 of the second bolt member 70 are fixed by welding. Note that a configuration is possible in which the opening 58 is closed by disposing a lid member such as a plate member on the opening 58 and welding the lid member to the surrounding fixing member 50. In the present embodiment, the fixing member 9 is provided such that a step is not formed between the surface of the fixing member 9 and the first end surface 51 of the fixing member 50. The surface of the fixing member 9 and the first end surface 51 function as the guide surface 11 that guides steam.

Figure 15:
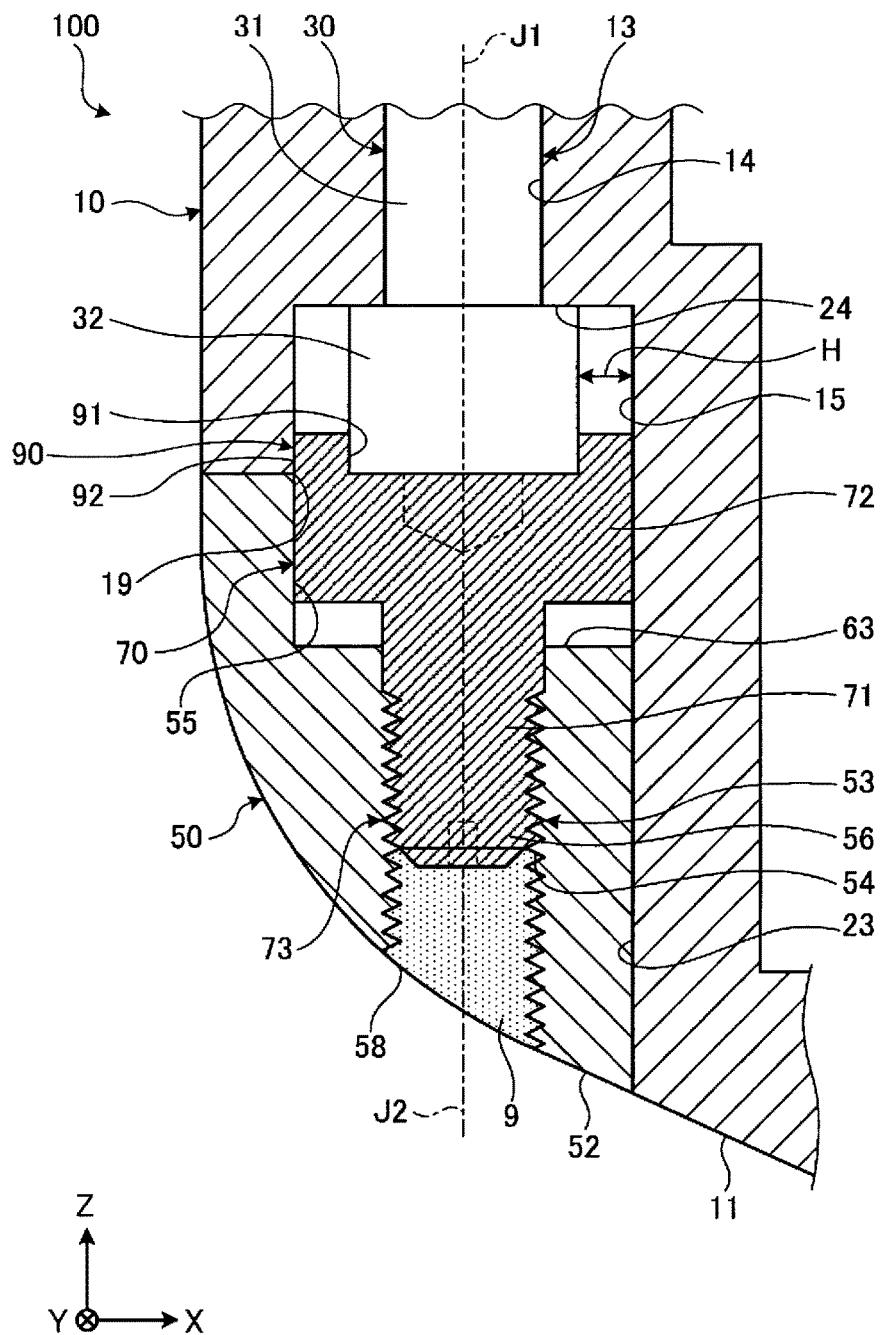
FIG. 15 is a cross-sectional view illustrating an example of the bolt fall-out preventing structure according to the embodiment of the present invention.
Figure 16:
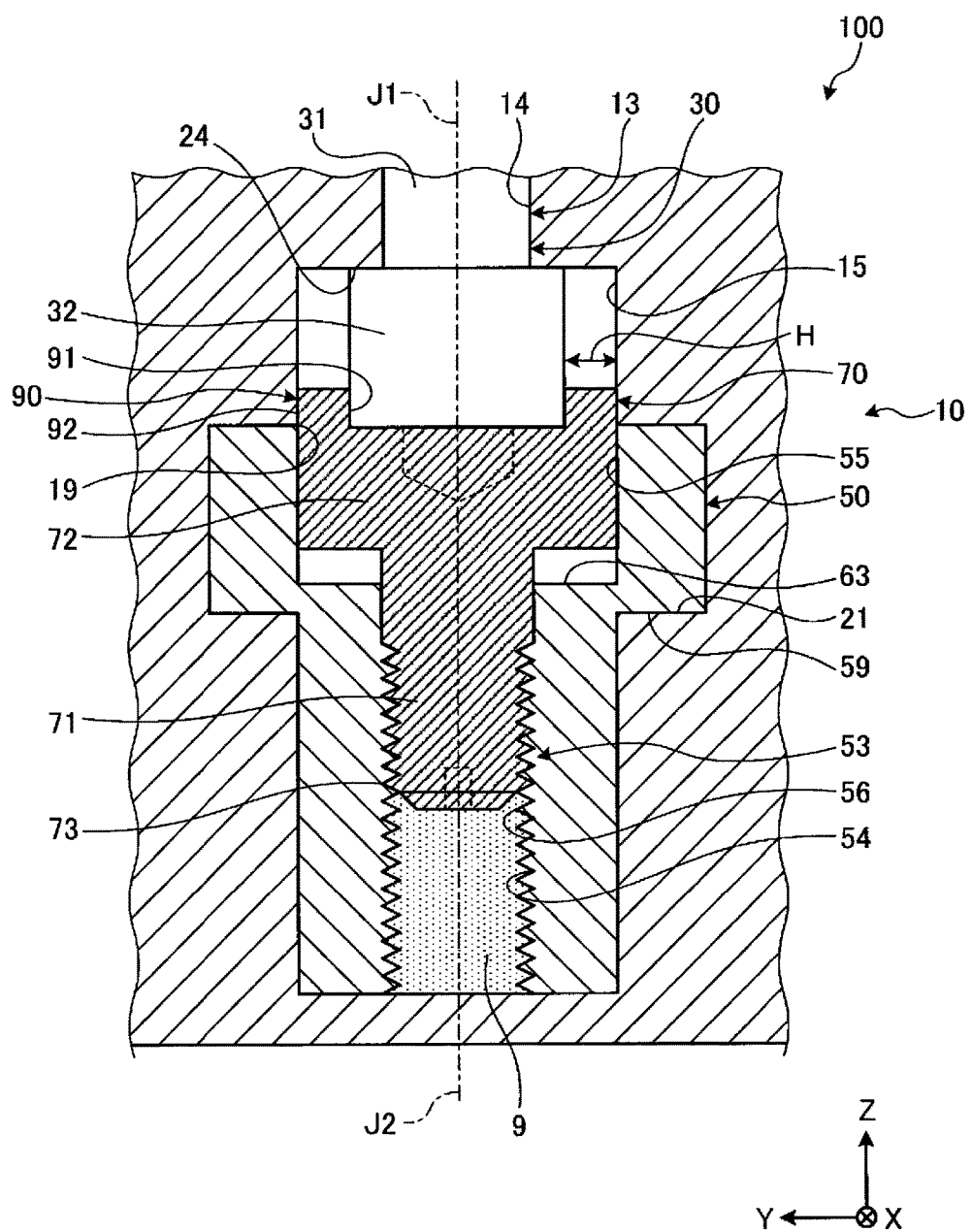
FIG. 16 is a cross-sectional view illustrating an example of the bolt fall-out preventing structure according to the embodiment of the present invention.

The bolt fall-out preventing structure 100 assembled in this manner is described using FIGS. 15 and 16. FIG. 15 is a cross-sectional view parallel to the XZ plane that illustrates a portion of the bolt fall-out preventing structure 100. FIG. 16 is a cross-sectional view parallel to the YZ plane that illustrates a portion of the bolt fall-out preventing structure 100.

In the state where the fixing member 50 has been engaged in the recessed portion 20 of the flow guide 10, the first head portion 32 of the first bolt member 30 opposes the second head portion 72 of the second bolt member 70. At this time, the axial lines of the axis J1 of the first bolt member 30 and the axis J2 of the second bolt member 70 match. The first bolt member 30 is fixed in a state where a gap H is provided between the first head portion 32 and the inner surface of the second portion 15 of the first hole 13. At least a portion of the first shaft portion 31 of the first bolt member 30 is disposed in the first portion 14 of the first hole 13, and the first head portion 32 of the first bolt member 30 is disposed in the second portion 15 of the first hole 13. At least a portion of the second shaft portion 71 of the second bolt member 70 is disposed in the third portion 54 of the second hole 53, and the second head portion 72 of the second bolt member 70 is disposed in the fourth portion 55 of the second hole 53.

In this state, the second bolt member 70 is positioned such that the wall portion 90 of the second head portion 72 is aligned with the gap H. Additionally, a uniform surface is formed by the inner surface of the second portion 15 of the first hole 13 and the inner surface of the fourth portion 55 of the second hole 53. As such, when the second bolt member 70 is rotated by the tool mounted in the third groove 81 so as to separate the second head portion 72 from the boundary surface 63, the wall portion 90 of the second head portion 72 is fit in the gap H. At this time, the inner surface 91 of the wall portion 90 contacts the side surface of the first head portion 32, and the outer surface 92 of the wall portion 90 contacts the inner surface of the second portion 15 and the inner surface of the fourth portion 55 of the second hole 53.

Thus, movement of the first bolt member 30 in a direction orthogonal to the axis J1 is suppressed due to the wall portion 90 of the second head portion 72 of the second bolt member 70 being fit in the gap H. Additionally, rotation of the first bolt member 30 is suppressed. As a result, the first bolt member 30 can be prevented from falling out of the first hole 13.

Furthermore, the welded fixing member 9 is provided to fix the second bolt member 70 to the inner surface of the second hole 53. The second bolt member 70 is fixed and, also, the opening 58 of the third portion 54 of the second hole 53 is closed by the fixing member 9. As a result, rotation of the second bolt member 70 is suppressed and, thus, rotation of the first bolt member 30 is also suppressed.

Note that in the present embodiment, a configuration is possible in which the inner diameter of the first portion 14 of the first hole 13 is larger than the outer diameter of the first shaft portion 31, and the threaded portion 33 of the first shaft portion 31 is joined to female threads 8 of the hole 7 provided in the inner casing 4. That is, female threads need not be provided in the first portion 14, and the first shaft portion 31 need not be joined to the first portion 14. The first member, namely the flow guide 10, is more likely to deform than the support member, namely the inner casing 4. As such, if the flow guide 10 is deformed when female threads are provided in the first portion 14 of the flow guide 10 and the first shaft portion 31 is joined to the female threads of the first portion 14, the joining will not be carried out smoothly and the flow guide 10 may not be sufficiently fixed to the inner casing 4. In contrast, if the threaded portion 33 of the first shaft portion 31 is joined to the female threads 8 of the hole 7 provided in the inner casing 4 without being joined to the first portion 14 of the first hole 13, the flow guide 10 will be sufficiently fixed to the inner casing 4.

Note that in the present embodiment, a configuration is given in which the flow guide 10 is an intermediate flow guide disposed along the axial direction between the last stage blade 2B and the last stage vane 3. However, the flow guide 10 may be disposed downstream from the last stage blade 2B, or may be disposed upstream of the last stage vane 3. Additionally, the bolt fall-out preventing structure according to the present embodiment is not limited to applications for fixing a flow guide, and may be used in applications for fixing any member of a steam turbine.

In the present embodiment, an example has been described in which the bolt fall-out preventing structure is used to fix a member of a steam turbine, which is a type of rotary machine. However, the bolt fall-out preventing structure may be used to fix a member of a gas turbine or may be used to fix a member of a compressor, for example.

REFERENCE SIGNS LIST

1 Steam turbine
2 Rotor
2B Blade
3 Vane
3A Outer ring
3B Inner ring
3Fa Flow path
3Fb Flow path
4 Inner casing (support member)
4A End portion
4B End portion
4F Flow path
4H Internal space
5A Space
5B Space
6 End surface
7 Hole
9 Fixing member
10 Flow guide (first member)
10A End portion
10B End portion
11 Guide surface
12 End surface
13 First hole
13X Central axis
14 First portion
15 Second portion
16 Outer surface
17 Inner surface
18 Opening
19 Opening
20 Recessed portion
20H Space
20S Inner surface
21 Support surface
22 Opening (inlet)
23 Wall surface (positioning member)
24 Boundary surface
30 First bolt member
31 First shaft portion
32 First head portion
33 Threaded portion
34 Cylindrical portion
35 First groove
50 Fixing member (second member)
51 First end surface
52 Second end surface
53 Second hole
53X Central axis
54 Third portion
55 Fourth portion
56 Threaded portion
57 Opening
58 Opening
59 Opposing surface
60 First side surface
61 Second side surface
63 Boundary surface
70 Second bolt member
71 Second shaft portion
72 Second head portion
73 Threaded portion 74 Cylindrical portion
79 Second groove
80 Leading end surface
81 Third groove
90 Wall portion
91 Inner surface
92 Outer surface
100 Bolt fall-out preventing structure
150 Protruding member
151 Wire member
152 Tension adjusting device
160 Support member
AX Rotation axis
H Gap
J1 Axis
J2 Axis

The invention claimed is:

1. A bolt fall-out preventing structure comprising:
a first member to which a first hole is formed, the first hole includes a first portion and a second portion;
a first bolt member including a first head portion inserted into the first hole of the first member and disposed on the second portion, the first bolt member fixing the first member to a support member;
a second member to which a second hole is formed, the second hole includes a third portion and a fourth portion, the second member engaging with the first member;
a second bolt member including a second head portion that opposes the first head portion when the second bolt member is inserted into the second hole of the second member and the first member and the second member are engaged; and
a wall portion on the second head portion of the second bolt member, the wall portion being disposed between a side surface of the first head portion and an inner surface of the second portion.

2. The bolt fall-out preventing structure according to claim 1, wherein the first member includes:
an outer surface formed around an end portion opening of the first portion, the outer surface facing the support member;
a recessed portion in communication with an end portion opening of the second portion; and
a support surface supporting the second member on an inner surface of the recessed portion.

3. The bolt fall-out preventing structure according to claim 2, wherein the first member includes:
an inlet through which the second member is inserted in a direction parallel to the support surface; and
a positioning member positioning the second member inserted through the inlet.

4. The bolt fall-out preventing structure according to claim 1, wherein the first bolt member includes a first groove which is provided in the first head portion and in which a tool is mounted.

5. The bolt fall-out preventing structure according to claim 4, further comprising a closing member configured to close an end portion opening of the third portion.

6. The bolt fall-out preventing structure according to claim 1, further comprising a fixing member fixing the second bolt member to an inner surface of the third portion.

7. The bolt fall-out preventing structure according to claim 1, wherein the second bolt member includes a second groove which is provided in the second head portion and in which a tool is mounted.

8. The bolt fall-out preventing structure according to claim 1, wherein:
the first member includes a flow guide including a steam guide surface facing an internal space in which a rotor of a steam turbine is disposed; and
the support member includes at least a portion of a casing of the steam turbine.

* * * * *